Aug. 17, 1937.  C. F. MEINZER  2,090,455
PROCESSING OF LIGHTWEIGHT AGGREGATES
Filed Feb. 8, 1935
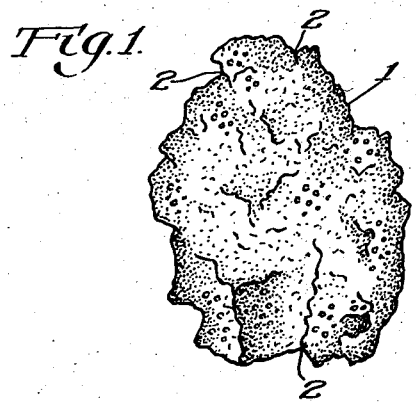
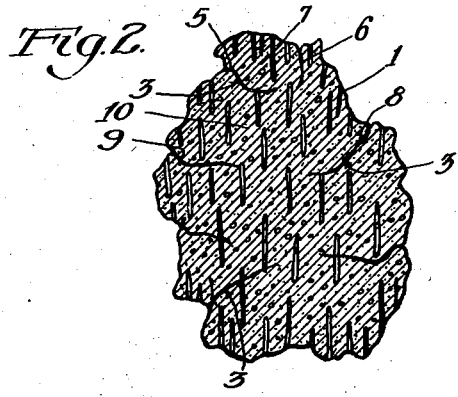
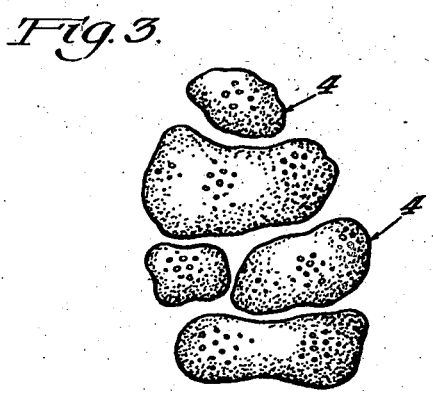
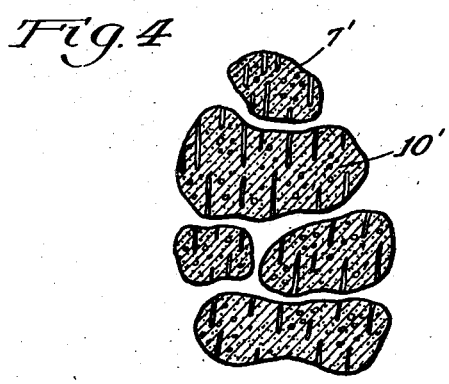
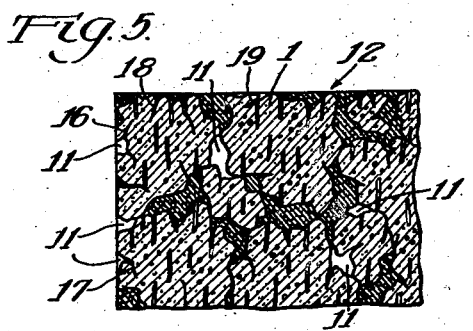
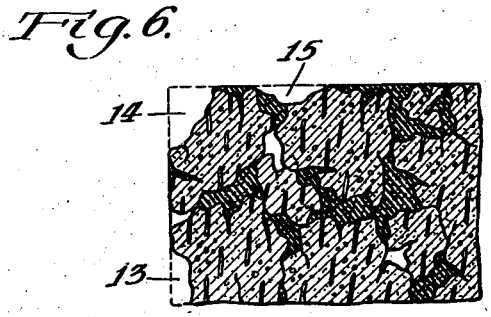
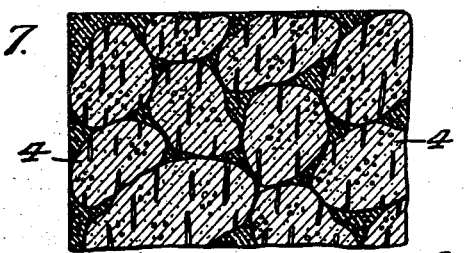
Inventor:
Carl F. Meinzer,
By: Lee J. Gary
Attorney Patented Aug. 17, 1937

2,090,455

UNITED STATES PATENT OFFICE 2,090,455

PROCESSING OF LIGHTWEIGHT AGGREGATES

Carl F. Meinzer, Chicago, Ill., assignor to Wallace L. Caldwell, Birmingham, Ala.

Application February 8, 1935, Serial No. 5,597

6 Claims. (Cl. 83—94)

This invention relates to light weight aggregates having improved physical properties for use in concrete and a process for improving said physical properties.

Light weight aggregates are, in general, products of four different classes:

(1) Synthetic cellular or porous products produced from molten metallurgical slag by processes of granulation or agitation which cause the slag to expand and develop a cellular structure before cooling.

(2) Synthetic cellular products produced from burned clay, shale or other ceramic materials by processes which cause the material to expand and develop a cellular structure, either before being burned or during the process of burning.

(3) Synthetic cellular products produced from glass by processes which cause the expansion of the glass while molten, with solidification to a cellular porous structure.

(4) Natural cellular products produced by the crushing of natural porous rocks such as pumice, tuff or tufa.

All of these light weight aggregates are produced by their various processes of manufacture, in some cases with and in other cases without supplementary crushing, in sizes such as are customarily required for use in concretes using Portland cement or other hydraulic cements.

These light weight cellular aggregates are commonly characterized by extremely rough and angular surfaces with numerous jagged projections and cavities. These products are also characterized by numerous checks or planes of cleavage in the internal structure of the particles of aggregate. These cleavage planes, for the most part, develop as a result of stresses set up within the material while cooling from a molten condition. It is to be understood, however, that my invention is not limited to the above class of material since the broad concept thereof contemplates improvement of any type aggregate wherein the same problem is presented.

The rough, angular surfaces, with projections and cavities, cause concrete made from such aggregates to be harsh and unworkable. Furthermore, aggregate composed of individual pieces having the characteristics described, has a materially higher percentage of voids than aggregates having the particles somewhat more rounded and free from rough, jagged edges and projections. The term "voids" is defined as the space surrounding and between the individual particles of aggregate and should not be confused with the cells or pores in the individual pieces of aggregate.

This invention has as one of its objects the reduction in the percentage of voids in light weight aggregate. One of the essential properties of any concrete is that it have sufficient plasticity to flow into place in a form or mold or slab without an excessive amount of tamping. Concretes made from unprocessed light weight aggregates, having the properties herein described, are decidedly unworkable with the result that it is difficult to use them in actual construction practice without excessive labor cost, and without the necessity of increasing the cement content of the concrete to an unreasonably high figure. A high cement content and a high percentage of water will, to some extent, aid in the workability of a concrete mixture, but the cost of such extra cement is high and the use of an excessively high water ratio causes undue shrinkage and segregation in the concrete. It is one of the purposes of this invention to improve these light weight aggregates with respect to their workability, strength and economy when used in various types of concrete mixtures.

Another inferior characteristic of such light weight aggregates is the presence of numerous cleavage planes in the particles of aggregates as ordinarily produced. These cleavage planes are a distinct source of weakness in such aggregates. These cleavage planes produce areas of low strength in the concrete produced with such aggregates, and thereby cause such concretes to have lower tensile and compressive strengths than is the case when such cleavage planes are eliminated. These planes also give entrance to moisture when the particles of aggregate are on the exposed surfaces of concrete. Such internal moisture causes concrete to disintegrate if exposed to freezing and thawing. It is one of the purposes of this invention to improve light weight aggregates by eliminating a majority of these cleavage planes in particles of the aggregate, thereby improving their quality with respect to soundness, absorption and friability.

It has been found in actual manufacture of light weight aggregates by several processes that the exterior surface, including the various projections on the surface of the particles of aggregate as produced, is of somewhat greater density and of a less cellular structure than the interior of the same particles. One of the primary purposes of such an aggregate is to produce a concrete of the lightest possible weight consistent with the desired strength. Therefore, another objective accomplished through this invention is the removal of the more dense and heavier surface skin of the particles, thereby producing an aggregate of considerably lower specific gravity than would otherwise be the case.

Further objects and advantages of my invention will be apparent from the accompanying drawing and following detailed description.

In the drawing, Fig. 1 is an elevational view of the usual untreated light weight aggregate illustrating particularly the sharp projections and crevices characteristic thereof.

Fig. 2 is a cross-sectional view of the piece of aggregate shown in Fig. 1, illustrating particularly the planes of cleavage or planes of incipient fracture characteristic thereof.

Fig. 3 is a side elevational view of aggregates formed from the aggregate shown in Fig. 1 after processing, particularly illustrating the absence of surface projections and crevices.

Fig. 4 is a sectional view of the processed aggregate shown in Fig. 3, illustrating particularly the absence of planes of cleavage or planes of incipient fracture.

Fig. 5 is a sectional view of a piece of concrete comprising unprocessed light-weight aggregate, showing particularly the presence of voids adjacent the projections and crevices of the aggregates.

Fig. 6 is a similar view of the same piece of concrete after weathering, showing failures due to the presence of planes of cleavage in the aggregates.

Fig. 7 is a sectional view of a piece of concrete comprising the processed aggregate of my invention.

Referring in detail to the drawing, 1 indicates a piece of unprocessed light-weight aggregate of the type hereinbefore described, characterized by having a jagged external surface. Complementary to the jagged projections are a plurality of crevices 2 which together with said projections create an abnormal number of voids when the aggregate is used in concrete. By referring to Fig. 2, it will be seen that the aggregate 1 contains many planes of cleavage or planes of incipient fracture 3 which seriously weaken the aggregate.

In carrying out the present invention, light weight cellular aggregate, with rough, irregular and angular surfaces and projections, such as aggregate 1, is charged in a container (not shown) which is rolled or rotated for a limited period of time. During this treatment the surfaces and edges of the pieces of the light weight aggregate are slightly rounded, and the characteristic rough and jagged projections are either wholly or partially removed as shown best at 4 in Fig. 3. The rolling of the particles or pieces of light weight aggregate over one another produces a mild grinding action without crushing or breaking the particles except upon cleavage planes or lines of weakness produced by internal stresses developed during cooling. This breakage on cleavage planes results in the larger particles of the material containing such cleavage planes being converted into smaller particles free from checks or cracks caused by cleavage planes. The process can best be accomplished in a hollow, rotating, steel or metal cylinder having small perforations in the shell for the purpose of removing the fine material which accumulates as the result of the grinding action. The process can be accelerated by the use of ridges, baffles or projections on the interior of the cylinder and also by the use of a limited number of light weight metal or rubber balls.

As an example of the manner in which the aggregate in its unprocessed state is broken to form sound pieces of aggregate, reference is particularly made to Figs. 2 and 4 of the drawing. As has been hereinbefore described the unprocessed aggregate 1 contains a plurality of planes of cleavage or planes of incipient fracture 3. In the processing hereinbefore described the aggregate 1 in addition to having substantially all of the projections removed, may also crack along the planes 3 and form a plurality of smaller pieces of sound aggregate. For example, aggregate 1 may crack along planes 5 and 6 which may define, when completely broken a small piece of aggregate 7 which, as the processing continues forms the piece 7', a sound, rounded piece of aggregate. The planes 8 and 9 may meet during the jostling or tumbling of the aggregate to define the piece of aggregate 10 which may subsequently be formed into the sound, rounded piece of aggregate 10'. In this manner a large piece of unprocessed aggregate may during processing be formed into a plurality of sound, relatively smooth surfaced smaller pieces of aggregate.

Light weight aggregate manufactured under the method covered by U. S. Patent No. 1,483,241, granted to Emil Opderbeck under date of February 12, 1924, has been thoroughly tested by this process. Specific examples of tests showing the improvement in the processed aggregate over the unprocessed aggregate follow:

(A) Workability Tests

*Determined by Standard Slump Test of American Society for Testing Materials*

| Concrete mixtures parts by volume | | | Slump test in inches | |
|---|---|---|---|---|
| Portland cement | Sand | Light weight aggregate | Using unprocessed aggregate | Using processed aggregate |
| 1 | 2.5 | 3.5 | 1.75" | 5.00" |
| 1 | 2.0 | 2.5 | 4.50" | 6.25" |
| 1 | 2.1 | 3.4 | .87" | 2.00" |

In each of the above tests, the concrete mixtures were identical as to proportions of materials and volume of mixing water. The only difference was that in one series of tests, the unprocessed aggregate was used and in the other series the processed aggregate was employed. The test is significant in that it clearly shows the greater workability, through higher slump test, of the processed aggregate concrete. In actual practice this property is of the greatest importance. This decided change in physical property is brought about by the removal, during processing, of the rough, angular edges and the jagged surface projections of the pieces of aggregate with consequent reduction of voids in the aggregate.

(B) Density Tests

| | Unprocessed aggregate | | Processed aggregate | |
|---|---|---|---|---|
| | On ⅜" screen | On ½" screen | On ⅜" screen | On ½" screen |
| Wt. per cu. ft. | 43.5 | 40.0 | 44.6 | 42.0 |
| Spec. gravity of aggregate | 1.58 | 1.39 | 1.46 | 1.26 |

The above results show that the processing increases the weight per cubic foot of the crushed aggregate, while at the same time it reduces the specific gravity of the individual particles of aggregate. In other words, the percentage of voids is decreased. For example:

$$\text{Voids in } \tfrac{3}{8}'' \text{ processed aggregate} = \frac{(1.46 \times 62.5 - 44.6)}{1.46 \times 62.5} \times 100 = 51\%$$

$$\text{Voids in } \tfrac{3}{8}'' \text{ unprocessed aggregate} = \frac{(1.58 \times 62.5 - 43.5)}{1.58 \times 62.5} \times 100 = 56\%$$

The processing of the ⅜" aggregate reduced the voids from 56% to 51%, while in the ½" aggregate the processing reduced the voids from 54% to 47%. This reduction of voids is of great importance technically and commercially in that it permits concrete mixtures of suitable strength to be produced with materially lower cement factors.

The reduction of specific gravity of the individual particles of aggregate is of importance in that it holds down the weight of the finished concrete to within permissible limits.

These comparative tests can be readily visualized by referring to Figs. 5 and 7. In Fig. 5 it will be seen that voids 11 will be formed in a concrete block or section 12 by the adjacent disposition of irregular projections and crevices characteristic of this type of aggregate. It can readily be seen that it would be extremely difficult to cause the cement bonding medium, unless excessively liquid, to fill said voids. However, by using the processed aggregates 4 no difficulty in this regard is encountered since the surfaces of the aggregate are smooth and rounded and offer no resistance to the flow of the cement. Consequently, substantially no voids are existent in the finished concrete.

(C) ABSORPTION AND ADSORPTION TESTS

*Measured by immersion in water for one hour, then drying to constant weight at 105° C.*

| Percentage absorption plus adsorption | |
|---|---|
| Unprocessed aggregate | Processed aggregate |
| 2.2% | 1.4% |

The significance of this test is that the removal of the rough, jagged surface projections reduces the adsorption of surface film of water, and also tends to reduce absorption since the surface skin of the particles before removal is less cellular but has far more capillary pores than the interior of the particles, with result that absorption is greater in this surface skin.

(D) SOUNDNESS TESTS

*Determined by American Society for Testing Materials Sodium Sulphate Method. This is equivalent to freezing and thawing action of nature. Results are expressed in percentage by weight of material disintegrated from pieces of aggregate.*

| Sample No. | Percentage of loss | |
|---|---|---|
| | Unprocessed aggregate | Processed aggregate |
| 1 | 4.0 | 2.4 |
| 2 | 17.0 | 2.4 |

This test is of great significance and has been checked a large number of times, both by the A. S. T. M. accelerated soundness test and by actual freezing and thawing tests both of aggregate and of concrete produced. The cleavage planes characteristic of unprocessed aggregate give access to water and the aggregate and concrete soon show the effect by very noticeable disintegration.

Referring particularly to Figs. 5 and 6, the result of subjecting a piece of concrete containing unprocessed aggregate such as shown in Fig. 5 to freezing, or subjecting the same to the sodium sulphate test, is shown in Fig. 6. As has been hereinbefore pointed out the unprocessed aggregates 1 contain a plurality of cracks, planes of cleavage or planes of incipient fracture. If, in pouring the concrete, pieces of aggregate are disposed adjacent the forms and said cracks are brought into communication with the atmosphere, which situation is frequently the case, moisture or water finds its way through said cracks or planes of cleavage into the interior of the aggregates. If this concrete is then exposed to freezing temperature, the moisture or water within said cracks expands and tends to rupture the aggregate. This action is cumulative since each time expansion occurs the crack becomes wider and a greater amount of moisture can penetrate into the aggregate and eventually portions of said aggregate break away from the concrete structure as shown best at 13, 14 and 15 in Fig. 6. In addition, due to the irregular surface contour of the unprocessed aggregates 1, the outer surface of the concrete block 12 will be more or less "pock marked" or honeycombed due to the fact that the cement is unable to settle or find its way into the various crevices formed in the face of the aggregate.

In the examples illustrated in Figs. 5 and 6, it will be observed that voids 11 are formed adjacent the outer surface of the aggregate and that cracks 16, 17 communicate with said voids. Moreover, as shown at 18 and 19 in Fig. 5, cracks open to the external surface of the concrete block 12, consequently, when said block is exposed to moisture or water, said moisture and water find its way into the planes of cleavages 16, 17, 18 and 19 and if freezing occurs, said water expands widening the cracks. As has been hereinbefore described, said action is cumulative and after repeated freezing and thawing occurs, portions of the aggregate disintegrate. For instance, in Fig. 5 the planes of cleavages 16 and 18 may eventually join in which case a piece of the concrete block breaks away as shown at 14 in Fig. 6. As illustrated in Fig. 7 the external surface of the concrete block does not contain any crevices or pock mark since, the aggregate being rounded and smooth, the cement has no difficulty in completely surrounding the aggregate and finding its way into the interstices between adjacent pieces of aggregate. Moreover, in view of the fact that the processed aggregate is sound, even if portions of the aggregate are in communication with the atmosphere, no cracks or planes of cleavage permit water to enter the interior of the aggregate.

(E) COMPRESSIVE STRENGTH TESTS

| Cement factor—Bags per cu. yd. | Concrete—Weight per cu. ft. | | Compressive strength Pounds per sq. in. | |
|---|---|---|---|---|
| | Unprocessed aggregate | Processed aggregate | Unprocessed aggregate | Processed aggregate |
| 4.1 | 90 | 87 | 898 | 1,796 |
| 3.0 | 86 | 77 | 615 | 1,100 |

A large number of compression tests using identical concrete mixtures, except for the aggregate, show that invariably, and for high strength structural concrete as well as for low strength fill concrete, the concrete mixtures produced with processed light weight aggregates show materially higher strengths than concrete using unprocessed aggregate.

I have also found that when I use the processed light weight aggregate in any concrete mixtures, I can materially reduce the amount of hydraulic cement which is required when the same light weight aggregate is utilized in its unprocessed form with its characteristic irregular and jagged surface. By extensive tests, I have found it necessary to use as much as seven (7) bags of hydraulic cement per cubic yard of structural concrete mixture when utilizing rough, jagged, unprocessed light weight aggregate, whereas I have been able to reduce the amount of hydraulic cement to five (5) bags or less per cubic yard of concrete when making use of the same light weight aggregate after being processed according to the present invention. The strength of the concrete produced with the processed light weight aggregate, with two (2) bags of cement less per cubic yard, has in all instances been equal or better than the strength of the mixture using the high quantity of cement and the unprocessed aggregate.

Light weight aggregates produced by several different processes, and of a number of different materials, have been available on the market for several years. The advantages resulting from their use in various types of construction are well known. However, because of the fact that light weight aggregates, with their characteristic rough, angular and jagged surfaces, do not lend themselves readily to normal flow and workability in concrete mixtures their use has been greatly restricted. Many attempts have been made by concrete workers to overcome this harshness and lack of workability, but in practically all instances the attempted solution was by the use of increased cement and water ratios which greatly increased the cost, and when excessive water ratios were used, they materially decreased the strength.

It has also been found that while unprocessed light weight aggregate produces concrete with an excess of porosity or honeycomb against forms, the processed aggregate produces a concrete having practically no porosity or honeycomb against forms, at the same time requiring much less cement and less labor.

I claim as my invention:

1. A method of treating a mass of particles of light-weight cellular aggregate having a plurality of planes of incipient fracture which comprises, subjecting said aggregate to forces of impact of sufficient intensity only to rupture said aggregate along said planes of incipient fracture, and without cracking of sound aggregate.

2. A method of treating light-weight cellular aggregate having a rough exterior surface and planes of incipient fracture which extend into the interior of the aggregate which comprises, subjecting said aggregate to forces of impact of just sufficient intensity to rupture said aggregate along said planes of incipient fracture and simultaneously subjecting said aggregate to abrasion to smooth the surfaces thereof.

3. A method of treating light-weight cellular aggregates which comprises, agitating a bulk of said aggregates to cause said aggregates to abrade and impact one another, just sufficient to smooth the surfaces of said aggregates and cause the aggregates to fracture along substantially all planes of incipient fracture.

4. A method of treating light-weight cellular aggregates having rough, irregular exterior surfaces and planes of incipient fracture which extend into the interior of the aggregates comprising, mildly agitating a bulk of said aggregates with just sufficient intensity to cause said aggregates to abrade and smooth one another's external surfaces, and impact upon one another to rupture the aggregates substantially only along said planes of incipient fracture.

5. A process for pretreating or polishing light weight cellular aggregate to adapt it for use in concrete mixtures, which comprises charging a bulk supply of said light weight aggregate to a container in the form of particles, rotating said container to cause the particles of light weight aggregate to roll over one another just sufficient to produce a mild grinding or polishing action which rounds the edges and smoothes the surfaces of said particles without cracking sound particles of aggregate, sifting out of the container the finer aggregates resulting from the rolling action and recovering the particles forming the residue of the bulk supply.

6. A process for pretreating or polishing light weight cellular aggregate having planes of incipient fracture to prepare the aggregate for use in concrete mixtures, which consists in rolling or rotating a mass of particles of the aggregate whereby the particles of aggregate are caused to roll over and impact one another just sufficient to rupture said particles along said planes of incipient fracture and produce a mild grinding or polishing action and rounding the edges and surfaces of the aggregate particles.

CARL F. MEINZER.